United States Patent
Ogata et al.

(10) Patent No.: US 9,300,546 B2
(45) Date of Patent: Mar. 29, 2016

(54) NETWORK COMMUNICATION METHOD, NETWORK COMMUNICATION SYSTEM, NETWORK COMMUNICATION APPARATUS AND PROGRAM USING SNMP WITH IMPROVED SECURITY

(75) Inventors: Hideaki Ogata, Yokohama (JP); Yoichi Takahashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 132 days.

(21) Appl. No.: 13/330,777

(22) Filed: Dec. 20, 2011

(65) Prior Publication Data

US 2012/0166608 A1 Jun. 28, 2012

(30) Foreign Application Priority Data

Dec. 27, 2010 (JP) ................................. 2010-289338

(51) Int. Cl.
*G06F 15/173* (2006.01)
*H04L 12/24* (2006.01)
*H04L 29/06* (2006.01)

(52) U.S. Cl.
CPC ............. *H04L 41/28* (2013.01); *H04L 63/101* (2013.01); *H04L 63/1466* (2013.01); *H04L 69/22* (2013.01); *H04L 12/2403* (2013.01); *H04L 41/0213* (2013.01)

(58) Field of Classification Search
USPC ........................................................ 709/223
See application file for complete search history.

(56) References Cited

U.S. PATENT DOCUMENTS

| | | | |
|---|---|---|---|
| 6,788,315 B1 * | 9/2004 | Kekic et al. .................... | 715/733 |
| 7,616,335 B2 * | 11/2009 | Yamaguchi et al. .......... | 358/1.15 |
| 7,877,469 B2 | 1/2011 | Fang et al. | |
| 2002/0032761 A1 * | 3/2002 | Aoyagi et al. ................. | 709/223 |
| 2003/0210699 A1 * | 11/2003 | Holt et al. ....................... | 370/400 |
| 2005/0165834 A1 * | 7/2005 | Nadeau et al. ............. | 707/103 R |
| 2006/0212554 A1 | 9/2006 | Shouno | |
| 2006/0253577 A1 * | 11/2006 | Castaldelli et al. ............ | 709/225 |
| 2007/0067428 A1 * | 3/2007 | Ogawa et al. ................. | 709/223 |
| 2008/0209204 A1 * | 8/2008 | Pamadi et al. ................ | 713/152 |
| 2009/0248791 A1 | 10/2009 | Shiraki | |
| 2010/0217837 A1 * | 8/2010 | Ansari et al. ................... | 709/218 |

(Continued)

FOREIGN PATENT DOCUMENTS

| | | |
|---|---|---|
| JP | 2000-181829 A | 6/2000 |
| JP | 2006-262409 A | 9/2006 |
| JP | 2009-522702 A | 6/2009 |

(Continued)

*Primary Examiner* — Hamza Algibhah
*Assistant Examiner* — James Edwards
(74) *Attorney, Agent, or Firm* — Maschoff Brennan (57) ABSTRACT

A method for network communication under SNMP includes: producing an access request when a first device accesses management information stored in a second device, the request containing additional information including identification information of the first device or identification information of a user of the first device in a value field included in a data field that contains an identifier field and the value field; transmitting the access request to the second device; and permitting the transmitted access request so that the number of devices or users accessing the second device may not exceed a predetermined number on the basis of the identification information of the first device or the user contained in the transmitted access request and identification information of a device or a user accessing the management information.

10 Claims, 7 Drawing Sheets

(56) References Cited

U.S. PATENT DOCUMENTS

2010/0229096 A1* 9/2010 Maiocco et al. .............. 715/734
2013/0212250 A1* 8/2013 Kleppner et al. ............. 709/224

FOREIGN PATENT DOCUMENTS

| JP | 2009-245075 A | 10/2009 |
|---|---|---|
| WO | 2007-089091 A1 | 8/2007 |

* cited by examiner

NETWORK COMMUNICATION METHOD, NETWORK COMMUNICATION SYSTEM, NETWORK COMMUNICATION APPARATUS AND PROGRAM USING SNMP WITH IMPROVED SECURITY

BACKGROUND

1. Technical Field

The present invention relates to network communication methods and the like using the Simple Network Management Protocol (SNMP), and in particular, the invention relates to a network communication method and the like which enables realization of an exclusive access, and further, enables improvement of communication security by means of relatively easy processing.

2. Related Art

To date, the Simple Network Management Protocol (SNMP) has been widely employed as a network management protocol, and management information communication using the SNMP protocol is performed between a management apparatus (an SNMP manager) and a managed apparatus (an SNMP agent) existing on a network. By using the SNMP, the SNMP manager accesses a management information database, i.e., a Management Information Base (MIB), included in the SMNP agent, and through this access, the SNMP manager can perform acquisition or setting of management information included in the MIB. For example, operations for printer management are sometimes performed in such a way that a host computer functioning as an SNMP manager accesses a printer functioning as an SNMP agent to perform setting of printing conditions or perform acquisition of status information, such as error status information.

As described above, the SNMP protocol is employed as a means for a remote access to management information, such as status information and setting values, included in each of network devices, such as a printer. The version 1 of the SNMP protocol (i.e., the SNMPv1 protocol) and the version 2c of the SNMP protocol (i.e., the SNMPv2c protocol) have been in widespread use.

With respect to the SNMPv1 protocol and the SNMPv2c protocol, unfortunately, there is a problem in that, in order to restrict accesses to management information, the SNMPv1 protocol and the SNMPv2c protocol each provide a basic authentication function using community names; however, it is easy to interpret the community names because the community names are transmitted over networks in plain text, so that it is difficult to fully prevent unauthorized accesses to the management information from malicious third parties.

Moreover, according to the SNMPv1 protocol and the SNMPv2c protocol, the communicated management information itself is also transmitted over networks in plain text, and thus, the management information is vulnerable to a leak of information resulting from eavesdropping of information transmitted over the networks.

Furthermore, the SNMPv1 protocol and the SNMPv2c protocol each are not provided with a function of accessing the management information exclusively, and thus, there is a concern in that occurrence of discrepancies in the management information and the like due to simultaneous accesses from a plurality of users (SNMP managers) makes it difficult for the SNMP managers to each perform acquisition or setting of intended information.

With respect to such problems on the SNMPv1 protocol and the SNMPv2c protocol, in JP-T-2009-522702, an authentication method which enables solution of a problem in that invaders can easily access the management data just by using community names has been proposed.

Furthermore, the version 3 of the SNMP protocol (the SNMPv3 protocol), which is an upper version of the SNMP protocol, provides an advanced authentication function and an encryption function.

However, the method having been proposed in JP-T-2009-522702 cannot solve the foregoing problems due to the eavesdropping of information transmitted over networks, and the simultaneous accesses.

Further, there is a problem in that the SNMPv3 protocol is specified so as to deal with a wide range of threats on information security, so that required processing is excessive for some devices. Moreover, the SNMPv3 protocol does not deal with the foregoing problem due to the simultaneous accesses.

Therefore, in the SNMPv1 protocol and the SNMPv2c protocol, it is desired to realize an authentication function and an encryption function each requiring a relatively light load process, as well as an exclusive access function.

SUMMARY

Accordingly, an advantage of some aspects of the invention is to provide a network communication method employing the SNMP protocol, which enables realization of an exclusive access, and further, enables improvement of communication security by means of relatively easy processing.

According to a first aspect of the invention, a method for network communication between a first device and a second device connected each other via a network under Simple Network Management Protocol, the method includes: producing an access request when the first device accesses management information stored in the second device, the request containing additional information including at least one of identification information of the first device and identification information of a user of the first device in a value field for storing value data of a target device and included in a data field together with an identifier field for storing identification information of the target device; transmitting the access request to the second device; and permitting the transmitted access request so that the number of devices or users accessing the second device may not exceed a predetermined number on the basis of the identification information of the first device and/or the user contained in the transmitted access request and identification information of a device and/or a user accessing the management information.

Further, the method for network communication according to the first aspect, the identifier field in the access request transmitted by the first device may include information indicating presence of additional information in the access request, and the value field therein may store the identification information and the value data of a target device.

Further, the predetermined number in the first aspect may be one.

Further, in the first aspect, preferably, upon permission of the access requested by the first device 1, the second device stores identification information of the first device or the user in the access request as identification information of a device or a user accessing the second device.

Moreover, in the first aspect, preferably, the additional information in the access request transmitted by the first device may include information for authenticating a sender of the access request and the second device may perform an authentication process on the basis of the information for authentication.

Further, in this case, the information for authentication may include a code which is generated on the basis of the transmitted access request.

Furthermore, the network communication method in this case may further include: encrypting identification information and value data of the target device in the access request transmitted by the first device, wherein information on the encryption is included in the additional information in the access request, and decryption the encrypted data on the basis of the information on encryption.

According to a second aspect of the invention, a network communication system includes: a first device; and a second device connected to the first device via a network under Simple Network Management Protocol, wherein the first device produces an access request when the first device accesses management information stored in the second device, the request containing additional information including at least one of identification information of the first device and identification information of a user of the first device in a value field for storing value data of a target device and included in a data field together with an identifier field for storing identification information of the target device; and transmits the access request to the second device; and the second device permits the transmitted access request so that the number of devices or users accessing the second device may not exceed a predetermined number on the basis of the identification information of the first device and/or the user contained in the transmitted access request and identification information of a device and/or a user accessing the management information.

According to a third aspect of the invention, a network communication apparatus communicates with a device connected each other via a network under Simple Network Management Protocol, wherein the network communication apparatus produces an access request when the communication apparatus accesses management information stored in the device, the request containing additional information including at least one of identification information of the communication apparatus and identification information of a user of the communication apparatus in a value field for storing value data of a target device and included in a data field together with an identifier field for storing identification information of the target device; and transmits the access request to the device; and when the communication apparatus receives an access request similar to the access request having been transmitted, the network communication apparatus permits the transmitted access request so that the number of devices or users accessing the communication apparatus may not exceed a predetermined number on the basis of the identification information of the device and/or the user contained in the transmitted access request and identification information of a device and/or a user in the device accessing the management information of the apparatus.

According to a fourth aspect of the invention, a program causes a network communication apparatus to execute communication processing, the communication apparatus communicating with a device connected each other via a network under Simple Network Management Protocol, wherein the program causes the communication apparatus to produce an access request when the communication apparatus accesses management information stored in the device, the request containing additional information including at least one of identification information of the communication apparatus and identification information of a user of the communication apparatus in a value field for storing value data of a target device and included in a data field together with an identifier field for storing identification information of the target device; and transmit the produced access request to the device, and when the communication apparatus receives an access request similar to the access request having been transmitted, the program causes the communication apparatus to permit the transmitted access request so that the number of devices or users accessing the communication apparatus may not exceed a predetermined number on the basis of the identification information of the device and/or the user contained in the transmitted access request and identification information of a device and/or a user in the device accessing the management information of the apparatus.

Further advantages and characteristics of the invention will be made obvious through the following description of an exemplary embodiment of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment according to the invention will be described with reference to the accompanying drawings. In addition, the technical scope of the invention is not limited to the embodiment, but covers clauses as set forth in the appended claim, and equivalents thereof.

Figure 1:
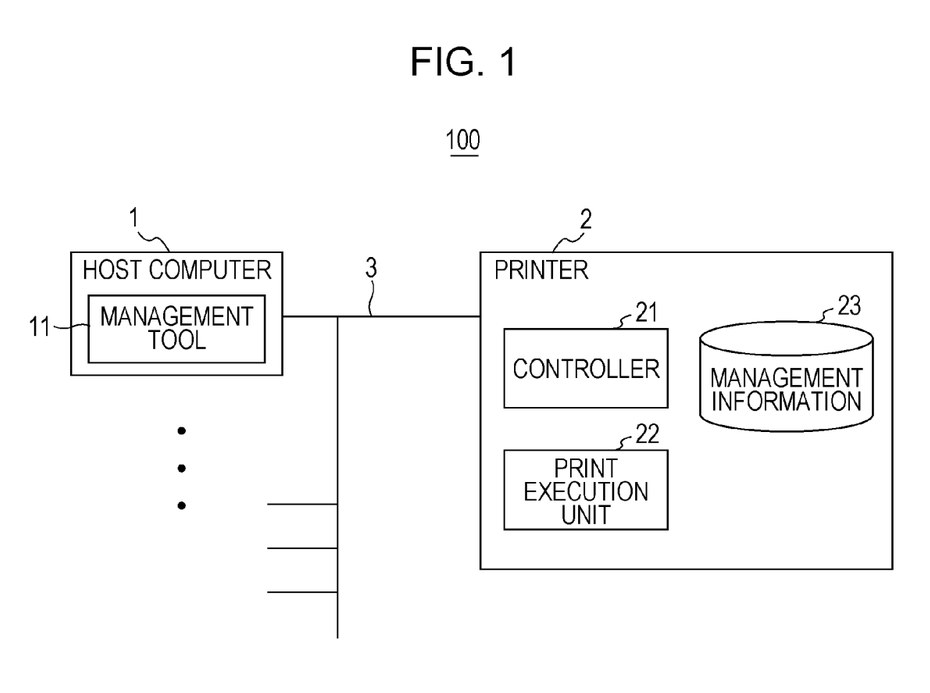
FIG. 1 is a diagram illustrating a configuration of a network communication system according to an embodiment of the invention.

Referring to FIG. 1 which is a diagram illustrating a configuration of a network communication system according to an embodiment of the invention, a network communication system 100, which is the network communication system according to this embodiment, includes at least one host computer 1 functioning as an SNMP manager and a printer 2 functioning as an SNMP agent, which are connected to each other via a network 3. In this system, a unique extension message compliant with the SNMPv1 protocol is used in communication between the host computer 1 and the printer 2. Further, control for an exclusive access to management information 23 of the printer 2, that is, control not to allow a plurality of users to make simultaneous accesses thereto, is performed on the basis of device identification information (a device ID) regarding the host computer 1, included in an extended portion of the extension message. Moreover, regarding the extension message, an actual data portion thereof is encrypted, and the extended portion thereof includes certain piece of information for authentication and encryption. Therefore, this mechanism makes it possible for a recipient device to, on the basis of the certain pieces of information for authentication and encryption, perform authorization of a sender of the extension message and decryption of the encrypted data included therein, and thus, leads to improvement of communication security in the SNMPv1 protocol.

In addition, FIG. 1 shows a plurality of the host computers 1 and one printer denoted by the printer 2, but a plurality of printers, each being connected to the plurality of the host computers 1 via the network 3, may exist. Further, the SNMPv1 protocol is employed in this embodiment, but the SNMPv2c protocol may be employed as substitute for the SNMPv1 protocol.

The host computer 1 is realized by a general personal computer and the like, and the host computer 1 includes a CPU, a RAM module, a HDD, a communication interface, a display unit, an operation unit and the like, all of which are omitted from illustration in FIG. 1. The host computer 1 functions as a host apparatus which issues print instructions to the printer 2, and further, as described above, the host computer 1 has a function of accessing the management information 23 to perform acquisition or setting of certain management information included in the management information 23.

A portion which performs the function of accessing the management information 23 is a management tool 11 shown in FIG. 1. Further, administrators of the printer 2 utilize this management tool 11 to change setting values for the printer 2, acquire status information regarding the printer 2, and the like. The management tool 11 is configured to include programs describing processes of acquisition and processes of setting of management information regarding the printer 2, the CPU executing the processes in accordance with the programs, the RAM module retaining data in process, the HDD storing the programs therein, and the like. Moreover, the programs, which are stored in the HDD as utility software for the printer 2, are installed from a CD, or are downloaded from a predetermined site via the Internet or the like.

Furthermore, the HDD of the host computer 1 stores therein a device ID which is identification information corresponding to the host computer 1 itself, as well as an authentication/encryption key for the above-described authentication and encryption. The device ID is identification information for the case where the extension message compliant with the SNMP protocol is used, and the device ID is determined and stored in the host computer 1 in advance. Further, the authentication/encryption key is a common key which is also retained at the printer 2. The authentication/encryption key is also determined and stored in the host computer 1 in advance.

Next, the printer 2 is a device which performs printing in accordance with the print instructions from the host computer 1, and as shown in FIG. 1, the printer 2 includes a controller 21, a print execution unit 22, management information 23, and the like. Further, as described above, the printer 2 is subjected to accesses from the host computer 1 as an SNMP agent.

The controller 21 is a portion which performs control of the entire device. Particularly, upon reception of the print instruction, the controller 21 executes a process on print data, issues a print instruction to the print execution unit 22, and the like. Moreover, the controller 21 also executes a process of responding to an access to the management information 23 from the host computer 1. In addition, the controller 21 is configured to include a CPU, a RAM module, a ROM module, an NVRAM module, an ASIC, a HDD, and the like. The controller 21 performs the process of responding to the access by causing the CPU to operate in accordance with programs stored in the ROM module.

The print execution unit 22 is a portion which executes a printing process on a print medium in accordance with the print instruction from the controller 21.

Next, the management information 23 includes various pieces of management information regarding the printer 2, and the management information 23 is stored in the HDD as the MIB. The management information 23 includes setting values for various operations of the printer 2 (for example, setting values for individual default printing conditions), and status information regarding statuses of the printer 2 (for example, individual pieces of error information) and the like. Further, the management information 23 is subjected to the accesses from the host computer 1, which are compliant with the SNMP protocol.

Figure 2A:
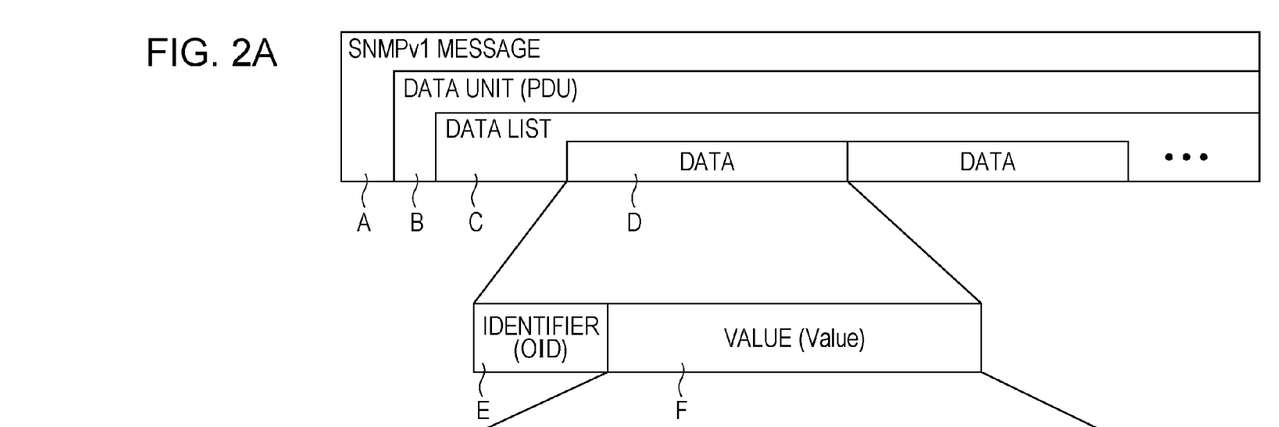
FIGS. 2A and 2B are diagrams illustrating a structure of an extension message according to an embodiment of the invention.
Figure 2B:
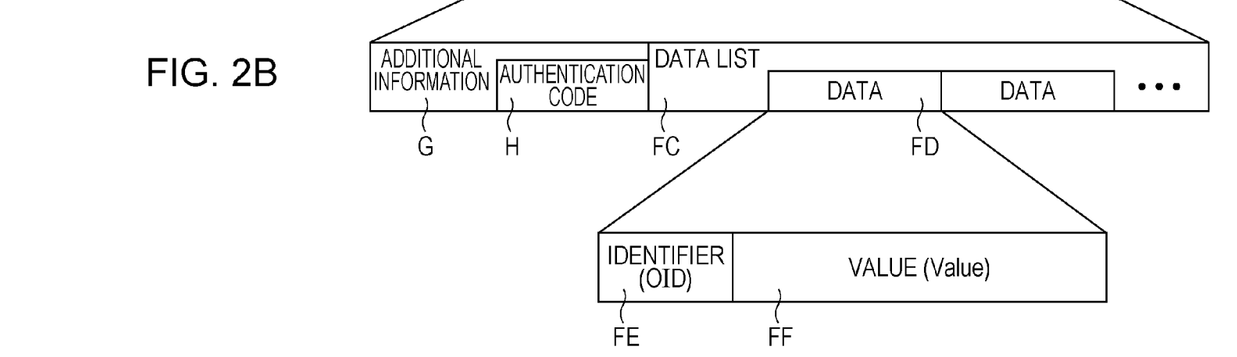

The network communication system 100 configured as described above has a feature in that communication using the extension message compliant with the SNMPv1 protocol is performed therein. Hereinafter, this extension message will be described. FIG. 2 is a diagram illustrating a structure of an extension message according to this embodiment.

Referring to FIG. 2A which is a diagram illustrating a data structure of a message compliant with the SNMPv1 protocol, the SNMPv1 message ("A" in FIG. 2A) includes a data unit (PDU) field ("B" in FIG. 2A), which is provided therein with a data list field ("C" in FIG. 2A) for storing data therein. The data list field is configured so as to be capable of including a plurality of blocks of data. Further, a field ("D" in FIG. 2A) in which each of the blocks of data is included has a field ("E" in FIG. 2A) in which an identifier (OID) is included, and a field ("F" in FIG. 2A) in which a value (VALUE) is included.

The identifier (OID) is an identifier for a MIB object to be accessed. In other words, the identifier (OID) is information for identification of a piece of management information targeted for access. Further, the value (VALUE) is a value associated with a piece of management information specified by the identifier. A pair of the identifier and the value constitutes each of the blocks of data.

An extension message according to this embodiment complies with such a standard structure of the SNMPv1 message as described above, and besides, includes various pieces of information in the value (VALUE) field to realize new functions. FIG. 2B shows a data structure of the value (VALUE) field when the SNMPv1 message is employed as an extension message.

As shown in FIG. 2B, the value (VALUE) field ("F" in FIG. 2B) includes an additional information field ("G" in FIG. 2B) and a data list field ("FC" in FIG. 2B). The additional information is information for individual functions which are newly realized by using the extension message. Specifically, the additional information includes pieces of information, such as the above-described device ID for the exclusive access, an encryption algorithm class and encryption parameters for the encryption function, and an authentication code for the authentication function.

The encryption algorithm class is information for specification of an encryption method, and the encryption parameters are pieces of information regarding parameters which are necessary depending on the encryption method. Further, the authentication code is a code which is generated at a sender side, and is authenticated by a target for access. The authentication code is included in an authentication code field ("H" in FIG. 2B) within the additional information field.

These pieces of additional information are interpreted by a recipient device, and are used to realize the individual functions.

Next, the data list field ("FC" in FIG. 2B) includes information which is to be included in the data list field ("C" in FIG. 2A) in the standard structure of the SNMPv1 message. Therefore, as shown in FIG. 2B, the data list field is provided therein with one or more data fields ("FD" in FIG. 2B) each including an identifier field ("FE" in FIG. 2B) and a value field ("FF" in FIG. 2B). These data fields include information similar to that in the case of the standard structure of the SNMPv1 message.

As described above, the extension message has a structure in which information to be included in the data unit (PDU) is capsulated into the value (VALUE) field of the SNMPv1 message. Further, when the extension message is used, in the identifier (OID) field ("E" in FIG. 2B), which forms a pair together with the value (VALUE) field including the capsulated information, a piece of information indicating that the SNMPv1 message is the extension message, i.e., an identifier for the extension message, is included. The identifier for the extension message is also a piece of information indicating that the additional information is included in the message.

The extension message having such a structure as described above is used in the network communication system 100 according to this embodiment, and production and interpretation of the extension message are performed by both the management tool 11 of the host computer 1 and the controller 21 of the printer 2.

Figure 3A:
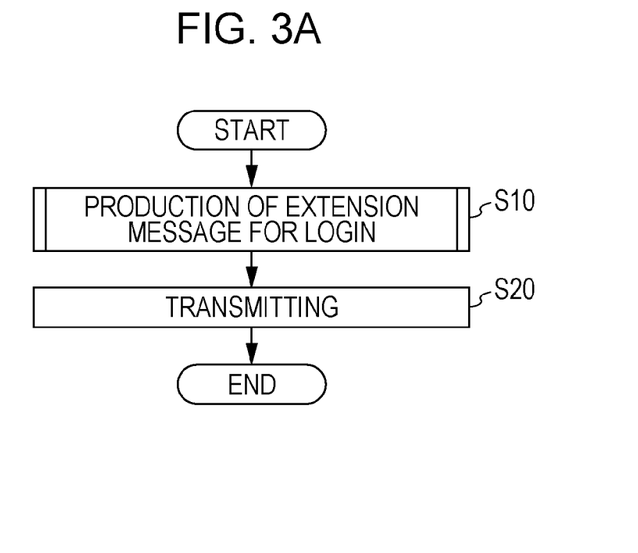
FIGS. 3A, 3B and 3C are flowcharts illustrating an example of login processing according to an embodiment of the invention.
Figure 3B:
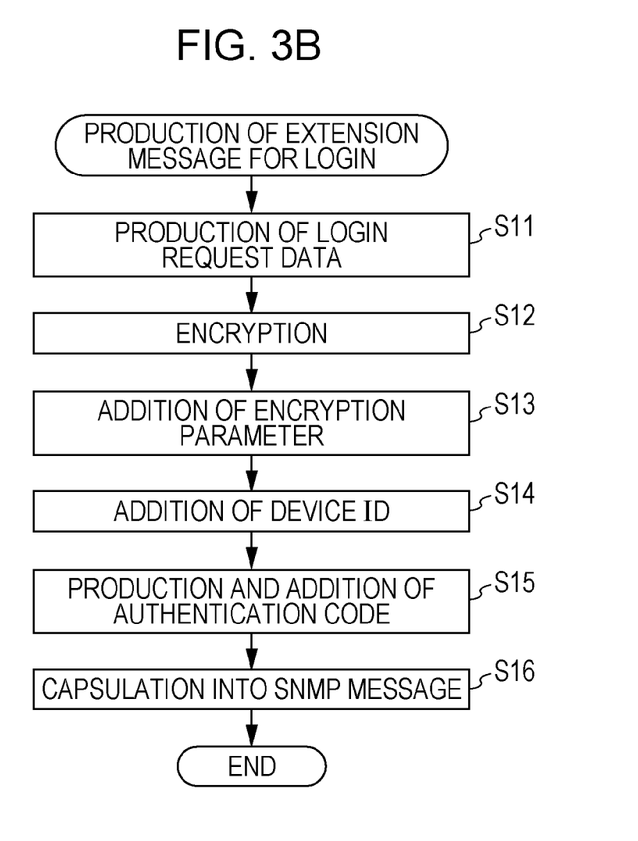
Figure 3C:
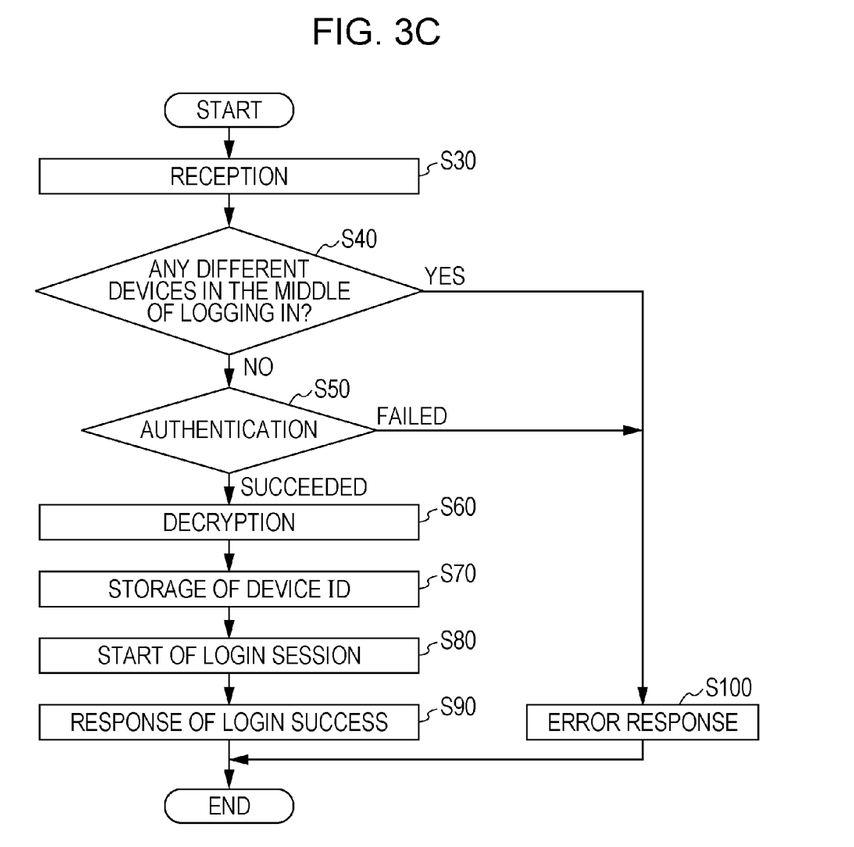

Next, specific processing for communication processes using the extension messages will be described. First, processing for a login to the management information 23 of the printer 2 from the host computer 1 will be described. FIGS. 3A, 3B and 3C are flowcharts each illustrating an example of processing for a login. Referring to FIG. 3A which shows processing performed at the host computer 1 side, first, an administrator or the like of the printer 2, who desires to make an access to the management information 23 included in the printer 2, performs an operation for notifying the management tool 11 of a request for a login to the printer 2. Upon reception of the notification, the management tool 11 executes production of an extension message for a login (step S10).

Referring to FIG. 3B which shows specific processing for the production of an extension message for a login, first, the management tool 11 produces login request data (step S11). Specifically, the management tool 11 produces two pieces of information regarding the request for a login, which are to be stored into the fields FE and FF shown in FIG. 2B, respectively. The one piece of information to be stored into the identifier field FE is identification information indicating that corresponding data is a request for a login or a logout, and the other piece of information to be stored into the value field FF is information indicating that a login is requested.

Figure 4A:
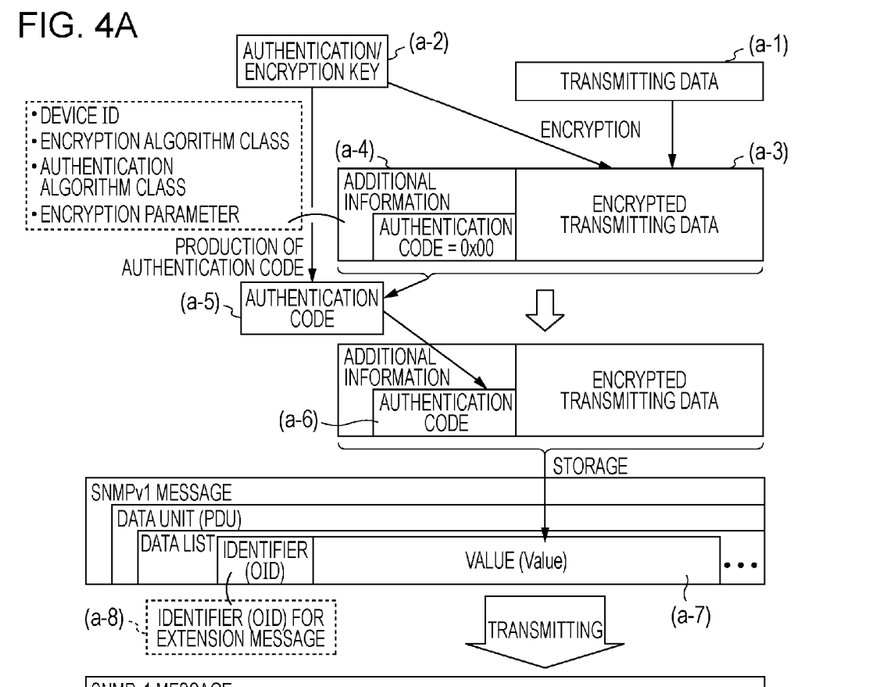
FIG. 4A is a diagram illustrating a procedure of production processes on an extension message to be transmitted, according to an embodiment of the invention.
Figure 4B:
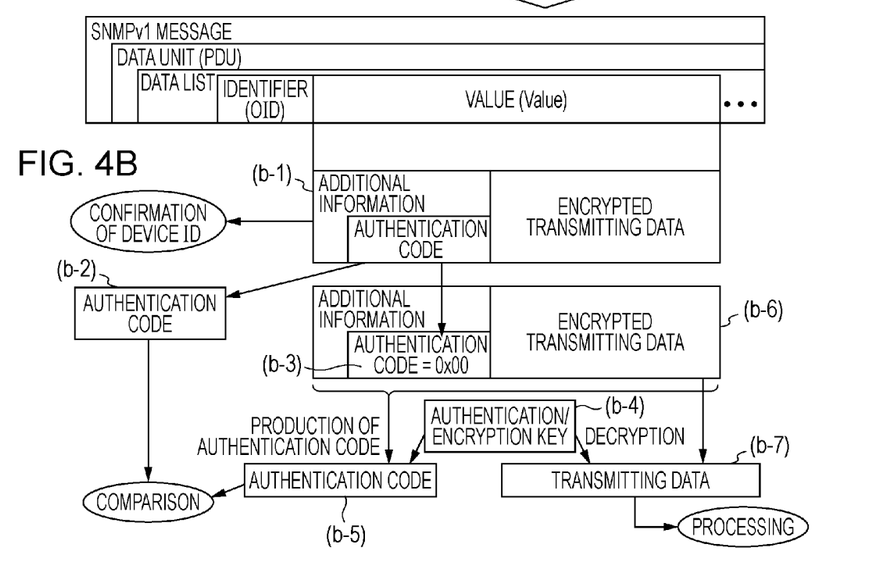
FIG. 4B is a diagram illustrating a procedure of reproduction processes on an extension message having been received, according to an embodiment of the invention.

FIG. 4A is a diagram illustrating a procedure of production processes on an extension message to be transmitted, and FIG. 4B is a diagram illustrating a procedure of reproduction processes on an extension message having been received. Referring to FIG. 4A, which shows a procedure of production processes on an extension message, transmitting data (a-1) corresponds to the login request data having been produced above.

Let us return to FIG. 3B, where, as a next step, the management tool 11 performs an encryption process on the login request data having been produced (step S12). In this encryption process, the management tool 11 encrypts the login request data in accordance with a predetermined encryption method by using the above-described authentication/encryption key, and further, adds information regarding an encryption algorism class having been used in the encryption process to the additional information. Moreover, in the case where, in the encryption process, the encryption method has needed encryption parameters, the management tool 11 also adds the encryption parameters to the additional information (step S13).

Referring to FIG. 4A, by using an authentication/encryption key (a-2) retained by the host computer 1, the transmitting data (a-1) is encrypted into encrypted transmitting data (a-3). Moreover, the encryption algorism class is added to additional information (a-4), and further, the encryption parameters are added to the additional information (a-4) when necessary.

In addition, any of various kinds of existing encryption methods can be employed as the encryption method. From among some predetermined encryption methods, an encryption method to be used is determined in accordance with a direction from an operator of the management tool, or a predetermined rule.

Next, the management tool 11 adds a device ID to the additional information (step S14). As described above, the host computer 1 has retained the device ID corresponding to the host computer itself, and thus, the host computer 1 retrieves the device ID, and adds the retrieved device ID to the additional information. Referring to FIG. 4A, the device ID is added to the additional information (a-4). Moreover, an authentication algorism class is also added to the additional information (a-4).

Subsequently, the management tool 11 produces an authentication code, and adds the produced authentication code to the additional information (step S15). As shown in FIG. 4A, the authentication code is produced in a method in accordance with the authentication algorism class by utilizing the produced additional information (a-4), the encrypted transmitting data (a-3) and the authentication/encryption key (a-2). In addition, at a timing prior to the production of an authentication code, each digit of a field into which the authentication code is to be stored is set to a value "0".

Any of various kinds of methods can be employed as the method for production of the authentication code. For example, a method in which a hash value of pieces of data for the production of the authentication code is utilized can be employed. Further, from among some predetermined methods for the production of the authentication code, a method to be employed is determined in accordance with a predetermined rule or a direction from an operator of the management tool. Moreover, as described above, a certain authentication algorithm class corresponding to the determined method is added to the additional information.

As shown in FIG. 4A, the authentication code (a-5) having been produced in such a manner as described above is added, as an authentication code (a-6), to the additional information having been produced so far. This authentication code (a-6) is a piece of information to be stored into the authentication code field ("H" in FIG. 2B). In other words, a piece of data included in the authentication code field, each digit of the data having a value "0", is replaced by the produced authentication code (a-5).

Through the processes having been performed so far, the extended portion of the extension message for a login has been completely produced, and then, in order to complete the SNMPv1 message, the management tool 11 stores the produced additional information and the encrypted transmitting data into the value (VALUE) field ("F" in FIG. 2A) of the SNMPv1 message, and further, stores the above-described identifier for the extension message into the identifier (OID) field ("E" in FIG. 2). That is, the extended portion having been produced through the described-above processes is capsulated into the SNMP message (step S16).

Referring to FIG. 4A, the information having been produced so far is stored into a field for a value (VALUE) (a-7), and the identifier for the extension message is stored into a field for an identifier (OID) (a-8).

When having completed production of the extension message for a login as the SNMPv1 message through the above-described processes, the management tool 11 transmits the produced SNMPv1 message to the printer 2 (step S20).

FIG. 3C shows processing performed at the printer 2 where the SNMPv1 message has been received, and FIG. 4B shows a procedure of processes on the received SNMPv1 message. Upon reception of the extension message for a login having been transmitted (step S30), the controller 21 of the printer 2 determines from the identifier (OID) for the extension message, which is included in the identifier (OID) field of the received message, that the received message is the extension message, and then, first, confirms whether, at this moment, any different devices each being in the middle of logging in to the management information 23 exist, or not (step S40).

In order to prevent occurrence of the above-described problem due to simultaneous accesses to the management information 23, the printer 2 is specified so that the number of devices (the number of users) allowed to simultaneously access to the management information 23 is limited to, for example, "1". That is, the printer 2 is specified so as to, when a certain device is in the middle of logging in to (accessing) the management information 23, disallow devices other than the certain device to login to (access) the management information 23.

As will be described below, when having allowed a certain one of the host computers 1 to login to the management information 23, the printer 2 retains a device ID corresponding to the certain one of the host computers 1 in the RAM module thereof. Therefore, in the confirmation step (step S40), the printer 2 compares a device ID included in additional information (denoted by (b-1) in FIG. 4B) of the message which has been received this time with the retained device ID, and if the two device IDs are different from each other, it is determined that a certain different device is in the middle of logging in to the management information 23. In contrast, if the two device IDs are the same, or no device ID is retained in the RAM module, it is determined that no different device is in the middle of logging in to the management information 23.

As a result of this confirmation, if it is determined that a certain different device is in the middle of logging in to the management information 23 ("YES" in step S40), the controller 21 does not accept the access which is requested through the received message, that is, the controller 21 does not allow the access, so that the controller 21 sends back an error response indicating the disallowance of the access thereto to the host computer 1 which is a sender of the received message (step S100), and then, terminates the login processing. In addition, the error response is also transmitted in the form of the extension message.

Meanwhile, if it is determined that no different device is in the middle of logging in to the management information 23 ("NO" in step S40), the controller 21 executes an authentication process (step S50). In this authentication process, as shown in FIG. 4B, first, an authentication code included in additional information of the received message is read out and retained as an authentication code (b-2) shown in FIG. 4B. Subsequently, an authentication code (b-5) is produced in a method in accordance with an authentication algorism class included in the additional information by using an authentication/encryption key (b-4) which has been retained by the printer 2, and an extended portion resulting from setting each digit of a field including the authentication code, which has been retained as the authentication code (b-2), to a value "0", that is, an extended portion including the additional information and the encrypted transmitting data (b-6). Further, the controller 21 compares the produced authentication code (b-5) with the retained authentication code (b-2), and if the two codes are matched with each other, it is determined that the authentication has succeeded; meanwhile, if the two codes are unmatched with each other, it is determined that the authentication has failed.

If the authentication has failed (in the case of "FAILED" in step S50), there is a concern in that the authentication/encryption code which is retained by a sender of the received message is not correct, or the transmitted data has been subjected to falsification on the way of transmission thereof. Thus, the controller 21 does not accept the message, sends back an error response to the host computer 1 which is a sender of the received message (step S100), and then, terminates the login processing.

Meanwhile, if the authentication has succeeded (in the case of "SUCCEEDED" in step S50), the controller 21 determines that the message has been transmitted from a correct sender, and the transmitted data has not been subjected to any falsifications on the way of transmission thereof, and accepts the message. Further, in order to perform a responding process, the controller 21 executes a decryption process (step S60). In this decryption process, as shown in FIG. 4B, by using the authentication/encryption key (b-4), and besides, the encryption parameters when necessary, the controller 21 decrypts the encrypted transmitting data (b-6) to reproduce original transmitting data (b-7) in a method in accordance with the encryption algorism class included in the additional information.

Subsequently, the controller 21 interprets the transmitting data having been decrypted, and recognizes that, in this case, the transmitting data is login request data having been produced by the host computer 1 which is a sender of the received message, so that the controller determines that a login is requested by the authenticated host computer 1. Here, since it is determined in step S40 that no different device is in the middle of logging in, the controller 21 accepts this request for a login, allows a login to the management information 23, and stores the device ID included in the additional information of the received message into the RAM module as part of information for specification of a device in the middle of logging in (step S70). The stored device ID is used in the above-described determination process in step S40.

Next, the controller 21 starts a login session for the login having been allowed (step S80), sends back a response, which indicates that the login has succeeded, to the host computer 1 which is a sender of the received message (step S90), and then, terminates the login processing. In addition, the response is also transmitted in the form of the extension message.

Figure 5A:
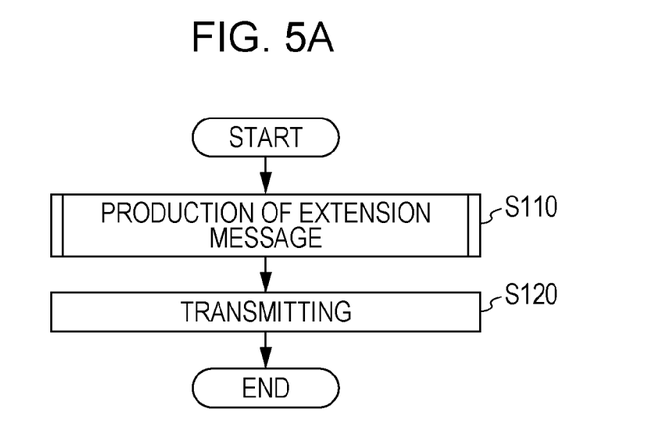
FIGS. 5A, 5B and 5C are flowcharts illustrating an example of communication processing during a login session, according to an embodiment of the invention.
Figure 5B:
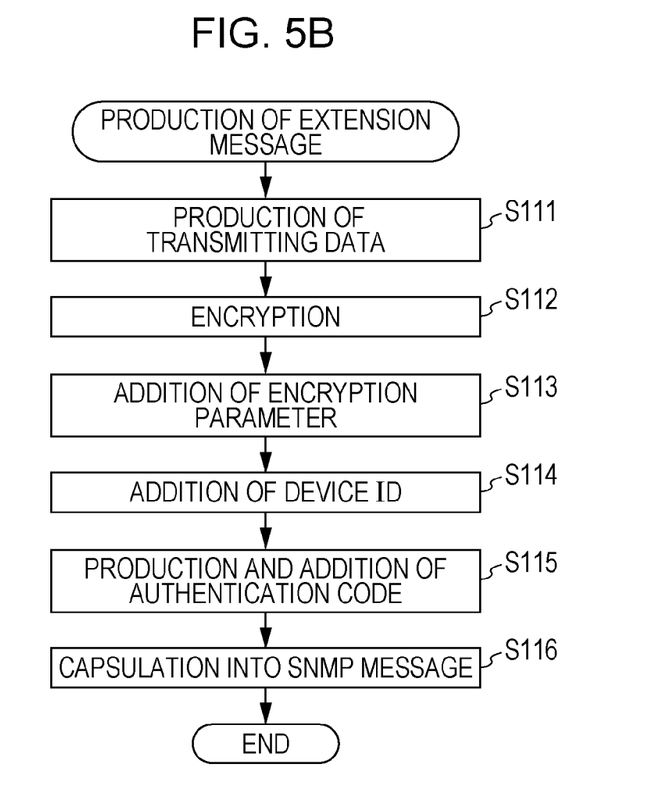
Figure 5C:
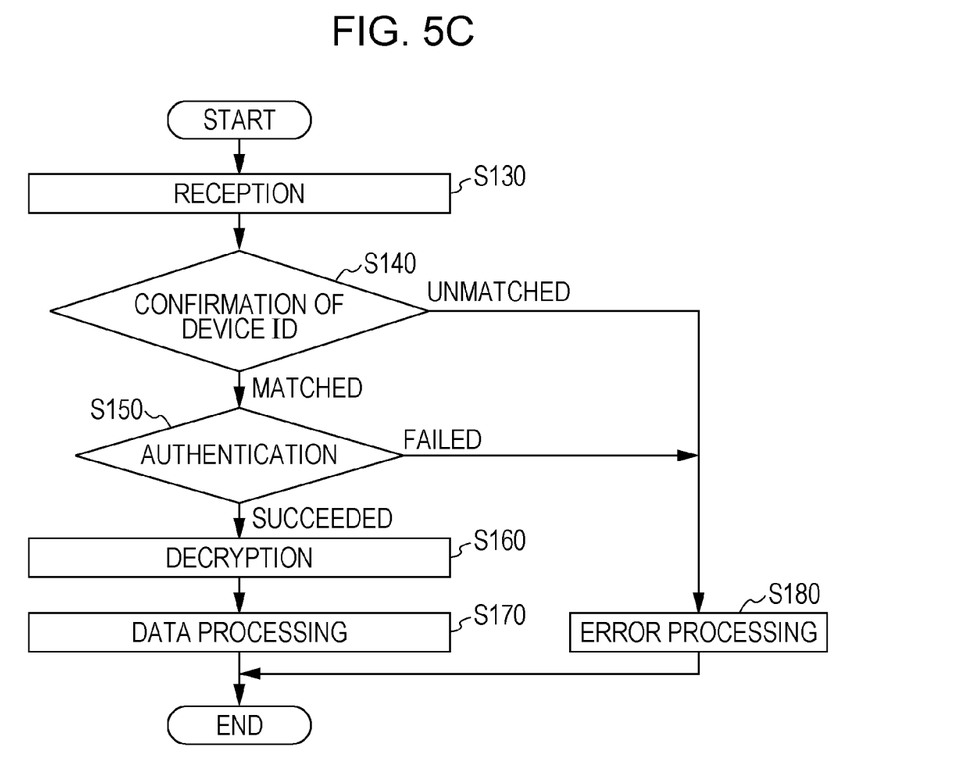

Next, communication processing during a login session will be described. FIGS. 5A, 5B and 5C are flowcharts each illustrating an example of a procedure of communication processes during a login session. Here, a message, via which the host computer 1 accesses the management information 23 of the printer 2 to acquire or set information included in the management information 23, is transmitted from the host computer 1 to the printer 2 in the form of an extension message, and the printer 2 receives the extension message and executes processes on the received extension message.

Referring to FIGS. 5A and 5B which show processes performed at the host computer 1 side, first, the management tool 11 produces data to be transmitted in the form of an extension message (step S110). Specifically, in the same manner as or in a manner similar to the above-described manner for production of the extension message for a login (steps S11 to S16 in FIG. 3B), the management tool 11 executes processes of production and encryption of transmitting data, addition of encryption parameters, addition of a device ID, production and addition of an authentication code, and capsulation into an SNMP message (steps S111 to S116). In addition, in this case, the transmitting data does not include data regarding a request for a login, but, in accordance with the content of information to be accessed, the transmitting data includes an identifier for a target for access and a value associated with the target for access.

Referring to FIG. 5C which shows processes performed at the printer 2 side, the controller 21 receives the extension message (step S130), and determines from an identifier (OID) for an extension message, which is included in the identifier (OID) field of the received message, that the received message is an extension message. Subsequently, the controller 21 confirms a device ID (step S140). This confirmation process is the same as or similar to that performed in step S40 in the case of the processing for the extension message for a login. If the device ID having been transmitted from the host computer 1 is unmatched with the device ID retained by the printer 2 ("UNMATCHED" in step S140), since simultaneous accesses from a plurality of devices are not allowed, the controller 21 does not accept the message, executes an error process (step S180), and then, terminates the communication processing. Specifically, the controller 21 performs a process of sending back an error response to the host computer 1 which is a sender of the received message in the same manner as or in a manner similar to that performed in step S100 shown in FIG. 3C.

Meanwhile, if the device ID having been transmitted from the host computer 1 is matched with the device ID retained by the printer 2 ("MATCHED" in step S140), in the same manner as or in a manner similar to that in the case of processing for the extension message for a login (steps S50 and S60 in FIG. 3C), the controller 21 executes an authentication process and a decryption process (steps S150 and S160). If the authentication has failed ("FAILED" in step S150), the controller 21 does not accept the message, executes the error process (step S180), and then, terminates the communication processing. Specifically, the controller 21 performs a process of sending back an error response to the host computer 1 which is a sender of the received message in the same manner as or in a manner similar to that performed in step S100 shown in FIG. 3C.

After having completed the decryption process, the controller 21 interprets the content of the decrypted transmitting data, and executes a data process in accordance with a request included in the transmitting data (step S170). For example, if the content of the transmitting data includes a request for acquisition of a value associated with a piece of predetermined management information, the controller 21 produces an extension message for reporting the value, and sends back the produced extension message to the host computer 1 which is a sender of the request for acquisition.

After the data process has been performed in such a manner as described above, the communication processing is terminated.

In addition, a logout is carried out in the same manner as or in a manner similar to a manner in the case of the extension message for a login. That is, the logout is carried out when the host computer 1, which is in the middle of logging in, transmits an extension message notifying a request for a logout to the printer 2. Further, when the printer 2 has not received the extension message notifying a request for a logout within a predetermined period of time, the printer 2 may carry out the logout. Furthermore, after execution of the logout, the controller 2 deletes a device ID stored in the RAM module, which corresponds to the host computer 1 having been logged out.

In addition, in the above-described embodiment, the number of devices allowed to login to the management information 23 of the printer 2 (i.e., the number of allowed login sessions, or the number of devices allowed to simultaneously make an access) is limited to "1", but the number thereof may be two or more within the scope in which occurrences of a harmful effect due to the simultaneous accesses can be suppressed. In this case, at the printer 2 side, device IDs of respective devices in the middle of logging in to (accessing) the management information 23 of the printer 2 are retained, and in order that the number of login sessions is kept to be not more than a predetermined number, every time a new extension message indicating a request for an access is received, it is determined whether the access is to be allowed or disallowed.

Further, in the above-described embodiment, the device IDs are used in the processing for the exclusive access, but the user IDs of the administrators or the like can be also used. This user IDs can also limit the number of users allowed to login to the management information 23 of the printer 2. In the case where the user IDs are used, the additional information of the extension message is provided therein with the user ID as substitute for the device ID.

Further, in the above-described embodiment, the host computer 1 functions as an SNMP manager, and the printer 2 functions as an SNMP agent, but it is assumed that, with respect to a certain device, such as a computer having its own management information (MIB) therein, as an SNMP manager, the certain device accesses management information included in each of other devices, and further, as an SNMP agent, the certain device is subjected to accesses to its own management information from other devices. In such a case as well, the extension messages can be used. In this case, it is possible for one device to perform both the above-described processing to be performed by the host computer 1 and the above-described processing to be performed by the printer 2.

As described above, the network communication system 100 according to this embodiment enables realization of an exclusive access to management information by means of relatively simple and easy processing, by using an extension message compliant with the SNMPv1 protocol, and causing identification information regarding an access originator to be included in the extended portion of the extension message. Thus, the network communication system 100 according to this embodiment enables elimination of problems due to occurrence of simultaneous accesses.

Further, the extended portion is provided therein with authentication information, and this mechanism enables realization of the authentication function. Thus, the network communication system 100 according to this embodiment enables solution of problems on security, such as spoofing, in the SNMPv1 protocol.

Moreover, when producing the authentication code for the purpose of authentication, the transmitting data itself is used in the production thereof. Thus, the network communication system 100 according to this embodiment enables elimination of problems due to falsification of data during transmission.

Furthermore, the transmitting data is encrypted along with providing the extension portion with encryption information, and this mechanism enables realization of the encryption function. Thus, the network communication system 100 according to this embodiment enables suppression of harmful effects due to eavesdropping and the like, in the SNMPv1 protocol.

In addition, in the above-described embodiment, the SNMP agent is a printer, but the invention can be applied to any device which functions as the SNMP agent, and which is capable of communicating and includes the management information (MIB).

The scope of protection of the invention is not limited to the foregoing embodiment, but covers the invention as set forth in the appended claims, and equivalents thereof.

The entire disclosure of Japanese Patent Application No. 2010-289338, filed Dec. 27, 2010 is expressly incorporated by reference herein.

What is claimed is:

1. A method for network communication between a first device and a second device connected each other via a network under Simple Network Management Protocol, the method comprising:
   producing an access request when the first device accesses management information stored in the second device, the access request being compliant with Simple Network Management Protocol and containing:
      a data unit composed of a data list which includes a plurality of a data, the data including an object identifier and a value;
      the object identifier field in which an object identifier is included for storing identification information of a target device; and
      a value field which includes a capsulated information which is also compliant with Simple Network Management Protocol, the value field including an additional information field and a data list field, the additional information field including at least one of the identification information of the first device, identification information of a user of the first device for the access request;
   transmitting the access request to the second device; and
   permitting the access request as determined by the second device so that at least one of the number of accesses by devices or the number of accesses by users may not exceed a predetermined number, the determination being made based on at least one of the identification information of the first device and/or the identification information of the user contained in the transmitted request for accessing the management information,
   wherein at least one of the identification information of the first device and the identification information of a user of the first device is not compliant with Simple Network Management Protocol.

2. The method for network communication according to claim 1, wherein the object identifier field in the access request transmitted by the first device includes information indicating presence of additional information in the access request, and the value field therein stores the identification information and the value data of a target device.

3. The network communication method according to claim 2, further comprising:
   encrypting identification information and value data of the target device in the access request transmitted by the first device, wherein information on the encryption is included in the additional information in the access request, and
   decryption the encrypted data on the basis of the information on encryption.

4. The method for network communication according to claim 1, wherein the predetermined number is one.

5. The method for network communication according to claim 1, wherein, upon permission of the access requested by the first device, the second device stores identification information of the first device or the user in the access request as identification information of a device or a user accessing the second device.

6. The method for network communication according to claim 1, wherein
   the additional information in the access request transmitted by the first device includes information for authenticating a sender of the access request, and
   the second device performs an authentication process on the basis of the information for authentication.

7. The method for network communication according to claim 6, wherein the information for authentication includes a code which is generated on the basis of the transmitted access request.

8. The network communication method according to claim 1, wherein the encryption function includes an encryption algorithm and encryption parameters.

9. A network communication system, comprising:
   a first device; and
   a second device connected to the first device via a network under Simple Network Management Protocol, wherein
   the first device produces an access request when the first device accesses management information stored in the second device, the access request being compliant with Simple Network Management Protocol and containing:
      a data unit composed of a data list which includes a plurality of a data, the data including an object identifier and a value;
      the object identifier field in which an object identifier is included for storing identification information of a target device;
      a value field which includes a capsulated information which is also compliant with Simple Network Management Protocol, the value field including an additional information field and a data list field, the additional information field including at least one of the identification information of the first device, identification information of a user of the first device for the access request;
   transmits the access request to the second device; and
   wherein the second device permits the access request transmitted by the first device by determining that at least one of the number of accesses by devices or the number of accesses by users may not exceed a predetermined number, the determination being based on at least one of the identification information of the first device or the identification information of the user contained in the transmitted request for accessing the management information, and
   wherein at least one of the identification information of the first device and the identification information of a user of the first device is not compliant with Simple Network Management Protocol.

10. A network communication apparatus communicating with a device connected each other via a network under Simple Network Management Protocol, wherein the network communication apparatus produces an access request when the communication apparatus accesses management information stored in the device, the access request being compliant with Simple Network Management Protocol and containing:
- a data unit composed of a data list which includes a plurality of a data, the data including an object identifier and a value;
- the object identifier field in which an object identifier is included for storing identification information of a target device; and
- a value field which includes a capsulated information which is also compliant with Simple Network Management Protocol, the value field including an additional information field and a data list field, the additional information field including at least one of the identification information of the first device, identification information of a user of the first device for the access request; and transmits the access request to the device,
wherein when the communication apparatus receives an access request similar to the access request having been transmitted, the network communication apparatus permits the access request having been transmitted by determining that at least one of the number of accesses by devices or the number of accesses by users may not exceed a predetermined number, the determination being based on at least one of the identification information of the first device or the identification information of the user contained in the transmitted request for accessing the management information, and
wherein at least one of the identification information of the first device and the identification information of a user of the first device is not compliant with Simple Network Management Protocol.

* * * * *